United States Patent [19]

Rohrle et al.

[11] Patent Number: 5,649,864

[45] Date of Patent: Jul. 22, 1997

[54] TORSION DAMPER, WITH LUBRICATED SPRINGS ESPECIALLY FOR A MOTOR VEHICLE

[75] Inventors: Dieter Rohrle, Montmorency; Ciriaco Bonfilio, Clichy, both of France

[73] Assignee: Valeo, Paris, France

[21] Appl. No.: 162,617

[22] Filed: Dec. 7, 1993

[30] Foreign Application Priority Data

Dec. 8, 1992 [FR] France ................................ 92 14761

[51] Int. Cl.$^6$ .................................................. F16D 3/80
[52] U.S. Cl. .................. 464/24; 192/214.1; 464/68
[58] Field of Search ...................... 464/66, 67, 68, 464/64, 24, 70.17; 192/106.2, 208, 210, 211, 212, 214.1; 74/574

[56] References Cited

U.S. PATENT DOCUMENTS

| | | | |
|---|---|---|---|
| 4,899,862 | 2/1990 | Graton et al. | 464/68 X |
| 5,030,166 | 7/1991 | Wörner et al. | 464/24 |
| 5,048,658 | 9/1991 | Reik | 464/24 X |
| 5,083,981 | 1/1992 | Förster | 464/24 X |
| 5,117,959 | 6/1992 | Graton | 464/68 X |
| 5,145,463 | 9/1992 | Bacher et al. | 464/68 X |
| 5,169,357 | 12/1992 | Graton | 464/68 X |
| 5,230,415 | 7/1993 | Ament et al. | 464/68 X |
| 5,238,096 | 8/1993 | Ament et al. | 464/68 X |
| 5,273,372 | 12/1993 | Friedmann et al. | 464/24 |
| 5,377,560 | 1/1995 | Schierling et al. | 464/68 X |

FOREIGN PATENT DOCUMENTS

| | | |
|---|---|---|
| 0308829 | 3/1989 | European Pat. Off. . |
| 3630398 | 5/1987 | Germany . |
| 3721711 | 1/1988 | Germany . |
| 3841639 | 12/1989 | Germany . |
| 3931429 | 4/1990 | Germany . |

Primary Examiner—Daniel P. Stodola
Assistant Examiner—Eileen A. Dunn
Attorney, Agent, or Firm—Longacre & White

[57] ABSTRACT

A torsion damper, especially for a motor vehicle clutch, comprises two coaxial parts, namely a primary and a secondary coaxial part respectively, which are mounted for rotation of one with respect to the other, with circumferentially acting springs, mounted in a grease cavity, acting between the two coaxial parts, while a centring bearing which closes the grease cavity, and a friction assembly, also act between the two coaxial parts. The friction assembly is arranged outside the cavity, with the centring bearing being between the cavity and the friction assembly.

10 Claims, 2 Drawing Sheets

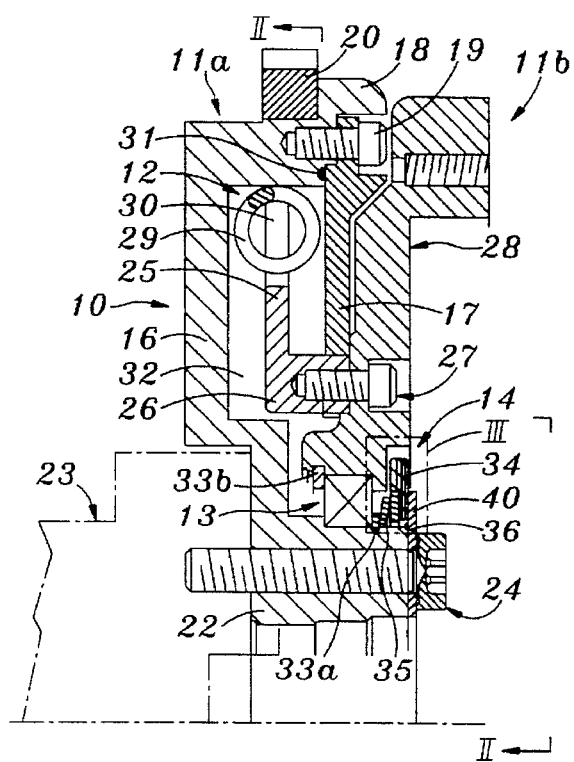
FIG. 1
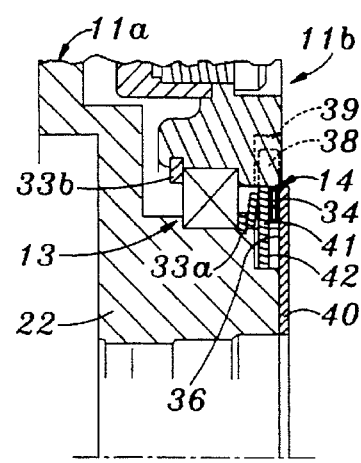
FIG. 4
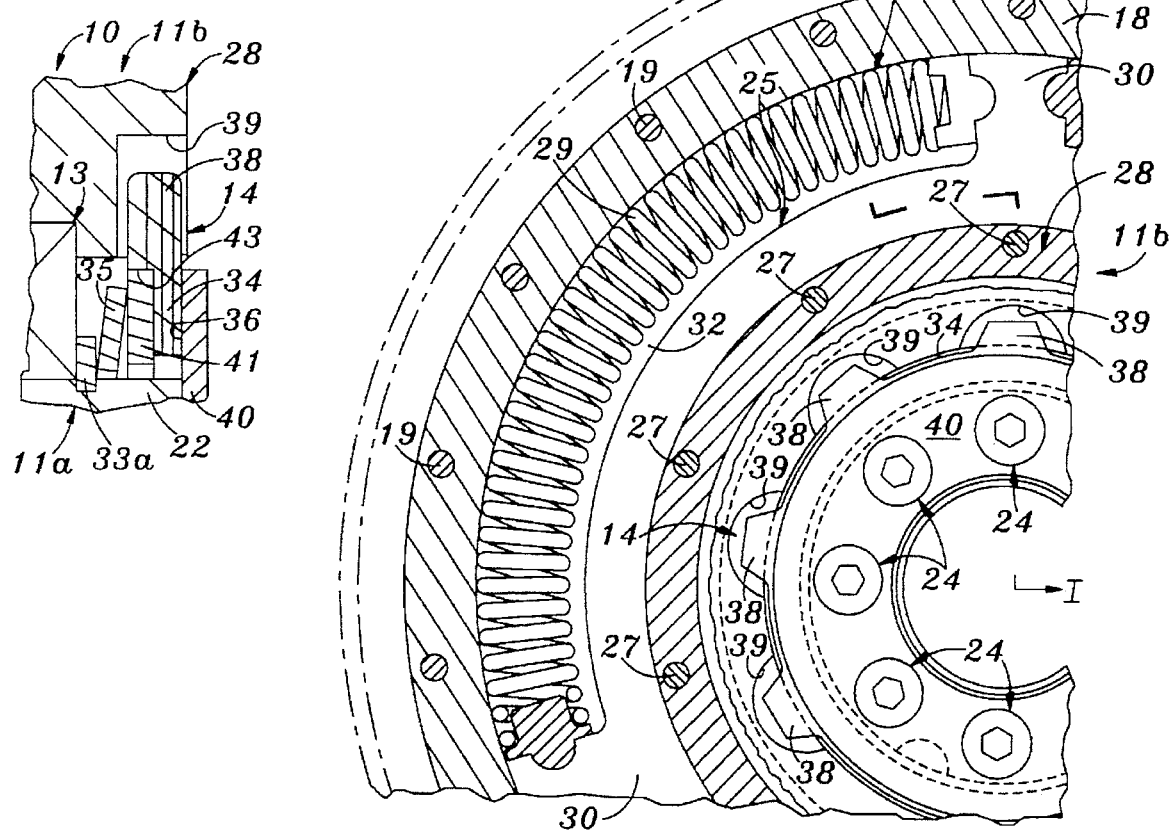
FIG. 3
FIG. 2

1

TORSION DAMPER, WITH LUBRICATED SPRINGS ESPECIALLY FOR A MOTOR VEHICLE

FIELD OF THE INVENTION

This invention is concerned in general terms with torsion dampers, especially but not exclusively those intended for use in motor vehicles, and being of the type comprising two coaxial parts, namely a primary coaxial part and a secondary coaxial part, which are mounted for rotation with respect to each other, together with centring means, circumferentially acting resilient means and friction means, all arranged between the said coaxial parts.

More particularly, the invention is directed to the torsion dampers of the above kind in which, especially for the purpose of lubricating the torsion damper and thus for limiting the parasitic friction which may arise from the action of the circumferentially acting resilient means, the latter are mounted within a grease cavity which is arranged to contain grease in which the circumferentially acting resilient means are immersed.

BACKGROUND OF THE INVENTION

In practice, this cavity is essentially formed in the primary coaxial part, and it is closed by the centring means. This is the case for example in the specification of German published patent application DE 3 931 429A. In that document, the friction means are also mounted in the same cavity. As a result, in that arrangement, the friction means are subjected to the lubricating action of the grease that is present in the cavity, which is detrimental to their effectiveness. A further result is that the products of wear in the friction means will inevitably contaminate the grease, and this again is detrimental to the effective action of the grease.

DISCUSSION OF THE INVENTION

An object of the present invention is to provide a torsion damper which does not have the disadvantages mentioned above, and which in addition has further advantages.

According to the invention, a torsion damper, especially for a motor vehicle, of the kind comprising two coaxial parts, namely a primary coaxial part and a second coaxial part respectively, which are mounted for relative rotation against the action of circumferentially acting resilient means interposed between the said coaxial parts and mounted in a cavity, with, also interposed between the said coaxial parts, centring means closing the said cavity and friction means, is characterised in that the said friction means are arranged outside the said cavity with the said centring means being between the cavity and the friction means.

With this arrangement the friction means are separated from the grease in the cavity, while wear products arising from the friction means are unable to penetrate into the grease cavity. In addition, access to the friction means is made particularly easy, which facilitates changing of the friction means during any reconditioning operation.

Features and advantages of the invention will appear more clearly on a reading of the detailed description which follows, of preferred embodiments of the invention, given by way of example only and with reference to the accompanying diagrammatic drawings.

BRIEF DESCRIPTION OF THE DRAWINGS

FIG. 1 is a partial view, in axial cross section, of a torsion damper in accordance with the invention, the cross section being taken on the broken line I—I in FIG. 2.

FIG. 2 is a partial view in transverse cross section of the same torsion damper, the cross section being taken on the broken line II—II in FIG. 1.

FIG. 3 repeats on a larger scale the detail of FIG. 1 which is indicated in the small box in phantom lines at III in FIG. 1.

FIG. 4 is a view in axial cross section of part of the same torsion damper, again repeating part of FIG. 1, but corresponding to a cross section taken along a line offset angularly with respect to the plane on which the cross section of FIG. 1 is taken, the damper seen in FIG. 4 being a modified embodiment.

DESCRIPTION OF PREFERRED EMBODIMENTS OF THE INVENTION

Figure 5:
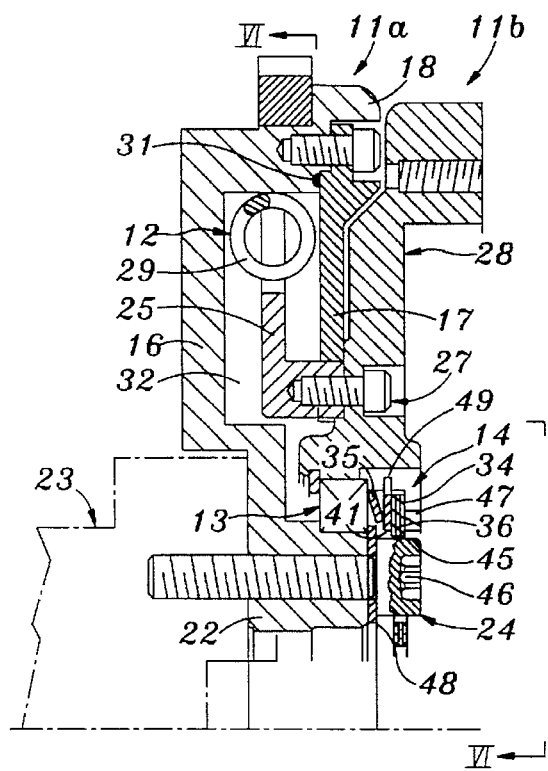
FIG. 5 is a view similar to FIG. 1 relating to a further embodiment of the invention, the cross section in FIG. 5 being taken on the broken line V—V in FIG. 6.

As shown in the drawings, and in a manner known per se, the torsion damper 10 comprises two coaxial rotatable parts 11A and 11B, namely a primary coaxial part 11A and a secondary coaxial part 11B, which are mounted for rotation with respect to each other; working between the two coaxial parts 11A and 11B are circumferentially acting resilient means 12, together with centring means 13 and friction means 14. The primary coaxial part 11A comprises two radial plates 16 and 17, with an enclosing ring element 18 which also acts as a spacer and which is integral with the radial plate 16, being arranged at the outer periphery of the two radial plates 16 and 17. The radial plate 17 is secured to this element 78, or flange, by means of screws 19, and carries an external starter crown 20. The primary coaxial part 11A also includes a hub 22 at the inner periphery of the radial plate 16, so that the assembly can be carried by means of the hub 22 on the end of a shaft 23 to which it is secured by means of screws 24. The hub 22 in this example is integral with the radial plate 16.

Also in this embodiment, the secondary coaxial part 11B includes a damper plate 25 which is arranged between the two radial plates 16 and 17 of the primary coaxial part 11A. The damper plate 25 is fixed with respect to a further hub 26, which engages against the radial plate 17. The coaxial part 11B also includes a plate 28 which is secured on the hub 26 of the damper plate 25 by means of screws 27. A clutch mechanism (not shown) can be secured on the plate 28 at the outer periphery of the latter.

In this example, the circumferentially acting resilient means 12 comprise a plurality of springs 29, which are arranged circumferentially between arms 30 of the damper plate 25 of the secondary coaxial part 11B, and which are arranged to cooperate at their ends with projecting elements (which are not shown in the drawings), carried for this purpose by the primary coaxial part 11A.

The radial plates 16 and 17 of the primary coaxial part 11A define, together with the spacing flange 18 which joins them together, a grease cavity 32 in which the circumferentially acting resilient means 12 are accommodated. These latter are lubricated by grease (not shown) which is contained in the cavity 32. The grease cavity 32 is of annular form and is generally coaxial with the axis of the assembly as a whole. It is closed by the centring means 13 at its inner periphery, i.e. that having the smaller diameter. In this example, the centring means 13 work radially between the hub 22 of the primary coaxial part 11A and the associated surface of the plate 28 of the secondary coaxial part 11B. In the present example the centring means 13 are in the form of a rolling bearing, which is retained in position on the outside by an elastic split ring 33A which engages with the hub 22 of the primary coaxial part 11A. The rolling bearing constituting the centring means 13 is retained on the inside by another elastic split ring 33B, which engages with the above mentioned surface of the plate 28 of the secondary coaxial part 11B. The rolling bearing constituting the centring means 13 has its own seals, in the usual way, which ensure the confinement of the grease contained in the cavity.

In the present example the torsion damper 10 is a torsion damper for a motor vehicle, and the shaft 23 is the crankshaft of the internal combustion engine of the vehicle, while the plate 28 is the reaction plate of a clutch which also has a friction disc (not shown). This friction disc is mounted on the input shaft of the associated gearbox for rotation with that shaft.

In addition, in order to prevent any leakage of grease, a sealing ring 31 is provided between the radial plate 17 and the spacing flange 18, while the passage which inevitably exists between the radial plate 17 and the hub 26 of the damper plate 25 is narrow. The rolling bearing constituting the centring means 13, which may have one or two rows of balls, also prevents any leakage of grease, as mentioned above.

The friction means 14 are disposed on the outside of the cavity 32, with the centring means 13 thus being located between the friction means 14 and the cavity 32. Apart from the fact that the friction means 14 are thus isolated from the grease which is present in the cavity 32, the reaction plate 28 is thus able to be brought very close to the radial plate 16. One example of an advantage of this arrangement is that the surface area which is defined by the plate 28 for engagement with the centring means 13 can be increased in length.

In this example, the friction means 14, which work in the axial direction, comprise a friction ring 34 which meshes, with a clearance, with one of the coaxial primary and secondary parts 11A and 11B. Under the biassing action of axially acting resilient means 35, the friction ring 34 is applied against a shoulder 36 which is fixed with respect to one of the coaxial primary and secondary parts 11A, 11B for rotation with that coaxial part.

In FIGS. 1 to 4, the friction ring 34 meshes, again with a clearance, with the secondary coaxial part 11B, while the shoulder 36 against which it bears is part of the primary coaxial part 11A. More precisely, in FIGS. 1 to 4, the friction ring 34 has on its outer periphery a set of teeth 38, through which it is engaged axially, with a circumferential clearance, in a set of corresponding apertures 39 (which in the present example are of semicircular profile) formed in the outer surface of the plate 28 of the secondary coaxial part 11B.

The shoulder 36 against which the friction ring 34 bears is in the present case formed on a ring 40, which is attached endwise to the hub 22 by means of the screws 24 by which the assembly is itself attached endwise to the shaft 23. The friction ring 34 is for example of a suitable synthetic material, and a thrust ring 41 is arranged to act between the axially acting resilient means 35 and the friction ring 34. In FIGS. 1 to 3, the thrust ring 41 is freely rotatable. However, in the modified embodiment shown in FIG. 4, the thrust ring 41 is mounted by means of a set of teeth 42 on the primary coaxial part 11A (the latter having the shoulder 36 against which the friction ring 34 bears). In the example shown, this set of teeth 42 is arranged between the inner periphery of the thrust ring 41 and the hub 22 of the primary coaxial part 11A.

Preferably, and as shown, the friction ring 34 has a rebate 43 (see FIG. 3) in which the thrust ring 41 is acccommodated and/or centred, this rebate being formed on the inner flank of the friction ring 34. The axial thickness of the teeth 38 of the friction ring 34 is thus greater than that of the main part of the friction ring 34.

In FIGS. 1 to 4, the axially acting resilient means 35 comprise a Belleville ring, which bears on the elastic split ring 33A and on the thrust ring 41. Thus the split ring 33A, which retains the centring means 13 in position, here has an additional function, which is to provide a surface for engagement of the axially acting resilient means 35 engaging on the friction ring 34.

However, in another embodiment not shown, the elastic split ring 33A is omitted, and the Belleville ring constituting the axially acting resilient means 35 bears directly on the centring means 13, and more precisely on the inner ring of the rolling bearing that constitutes the centring means 13. Retention of the rolling bearing in position is then ensured by: the ring 40, through the friction ring 34; the thrust ring 41; and the Belleville ring that constitutes the axially acting resilient means 35.

Figure 7:
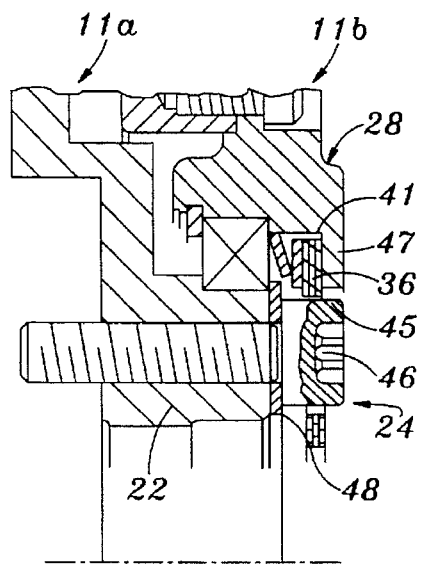
FIG. 7 is a partial view in axial cross section, repeating part of FIG. 5 but relating to a further embodiment of the invention.
Figure 6:
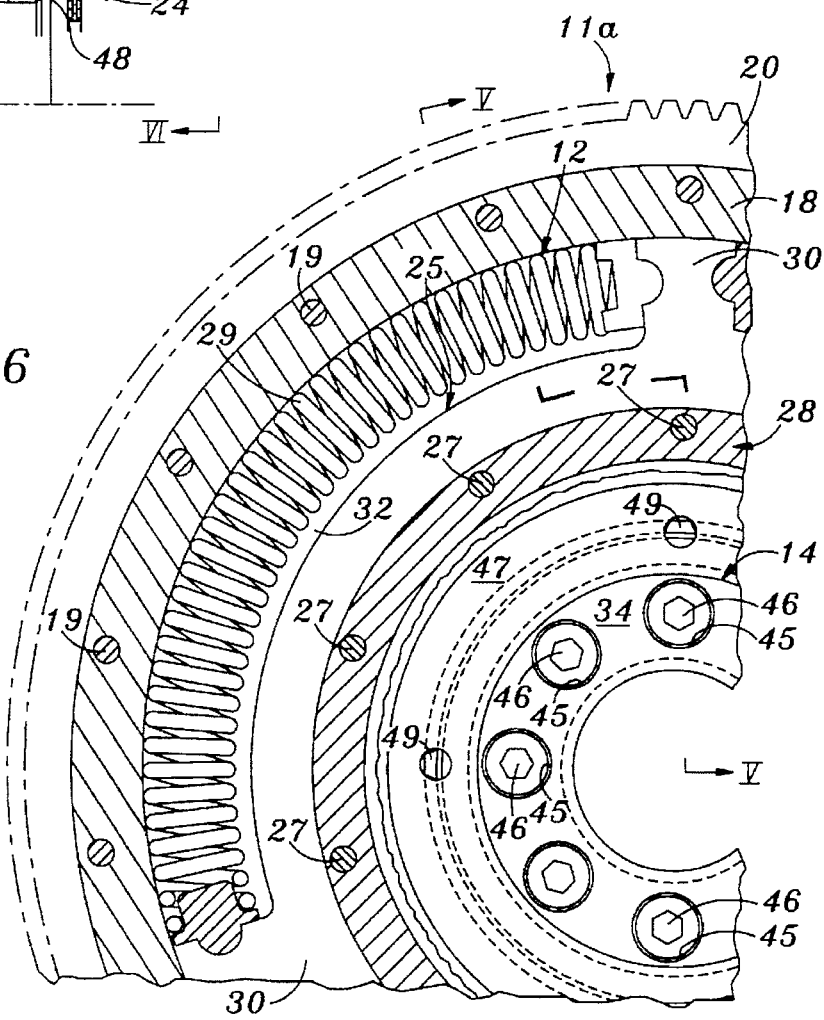
FIG. 6 is a cross section of the same embodiment as in FIG. 5, similar to FIG. 2 but with the cross section being taken on the broken line VI—VI in FIG. 5.

Reference is now made to FIGS. 5 to 7, in which the friction ring 34 meshes, again with a clearance, with the primary coaxial part 11A of the torsion damper, while the shoulder 36 against which it engages is now part of the secondary coaxial part 11B. In this embodiment, the friction ring 34 has a set of circular apertures 45, by means of which it is engaged axially (and again with circumferential clearance) with the heads 46 of the screws 24 which are present at the end of the hub 22 of the primary coaxial part 11A. This, as can be seen, enables the screws 24 to perform an additional function by means of its heads 46.

The apertures 45 may have a closed contour as shown. In a modification, however, they may be in the form of slots, and therefore in the form of openings with a discontinuous profile.

In FIGS. 5 to 7, the shoulder 36 against which the friction ring 34 bears is part of a radial ring element 47 which is fixed to the plate 28 of the secondary coaxial part 11B. As is best seen in FIG. 7, the ring element 47 extends radially inwardly from the inner periphery of the plate 28, and in this example it is integral with the latter. However, in a modification, it may be a separate component fixed to the plate 28, for example by means of screws, which enables the load exerted by the Belleville ring 35 to be adjusted by tightening or loosening the latter.

On the outer side, the centring means 13 are retained by means of a further ring 48, which is attached to the end of the hub 22 of the primary coaxial part 11A by means of screws 24. However, as before, this retention could just as well be achieved by the Belleville ring 35 itself. This Belleville ring bears directly on the centring bearing 13, and more precisely on its inner bearing ring.

In FIGS. 5 and 6 the thrust ring 41 which is arranged between the friction ring 34 and the axially acting resilient means (Belleville ring) 35 is carried on the secondary coaxial part 11B (for rotation with the latter), which includes the shoulder 36 against which the friction ring 34 engages, by means of a set of teeth 49 which work between its outer periphery, i.e. the periphery having the larger diameter, and the associated surface of the plate 28 of the secondary coaxial part 11B.

In FIG. 7 the thrust ring 41 is, by way of modification, freely rotatable.

In a further embodiment not shown, instead of being integral with the plate 28, the hub defined by the latter at its inner periphery is integral with the hub 26 of the damper plate 25, being secured, together with the hub 26, by means of screws 27 on to the plate 28.

The invention is, of course, not limited to the embodiments described above and shown in the drawings, but covers any practical variant, and/or combination of the various elements of the torsion damper, within the scope of the attached claims. It will be noted that in every case, access to the friction means is facilitated, and that detritus resulting from wear in the friction means is unable to penetrate into the grease cavity containing the circumferentially acting resilient means of the torsion damper.

In practice, these wear products are evacuated by the same routes as those conventionally provided for the removal of the products of wear in the friction disc of the associated clutch mechanism.

What is claimed is:

1. A torsion damper defining a cavity therein containing a lubricant and comprising: a primary rotatable part; a secondary rotatable part; means mounting said primary and secondary rotatable parts coaxially with each other for relative rotation; circumferentially acting primary resilient means mounted in said cavity; centering means in the form of a rolling bearing for centering the secondary rotatable part with respect to the primary rotatable part, said rolling bearing having seals closing said cavity; and friction means interposed between said primary and secondary rotatable parts to produce a damping effect, said primary resilient means, centering means and friction means being operatively arranged between said primary and secondary rotatable parts, wherein said friction means are disposed outside said cavity, so that said centering means is axially between and separates the cavity and the friction means.

2. A torsion damper according to claim 1, wherein said friction means comprise outside said cavity a friction ring meshing with a first one of said primary and secondary rotatable parts so as to define a clearance between said friction ring and said first one of said primary and secondary rotatable parts, with a second one of said coaxial parts defining a shoulder, the torsion damper further including axially acting second resilient means associated with said fiction ring for biassing the friction ring against said shoulder.

3. A torsion damper according to claim 2, wherein the friction ring meshes, with a clearance, with the secondary rotatable part while the shoulder against which the friction means bears is formed on the primary rotatable part.

4. A torsion damper according to claim 3, wherein said friction ring defines an outer periphery thereof having a set of teeth, said secondary rotatable part including a plate having an outer surface defining a set of apertures, with said set of teeth engaging axially in said apertures to define a circumferential clearance between the teeth and said apertures.

5. A torsion damper according to claim 3, wherein said primary rotatable part includes a hub having an end, a ring defining said shoulder, and means securing said ring to said end of the hub.

6. A torsion damper according to claim 2, further including a thrust ring arranged to act between said axially acting second resilient means and said friction ring, the friction ring being formed with a recess, with the thrust ring being accommodated and centered in said recess.

7. A torsion damper according to claim 2, wherein the friction ring meshes, with a clearance, with the primary rotatable part while the shoulder against which the friction ring bears is formed on the secondary rotatable part.

8. A torsion damper according to claim 7, wherein said friction ring defines a pitch circle and a set of apertures arranged on said pitch circle, said primary rotatable part having a hub defining an end thereof, the torsion damper further including screws at said end of the hub, with each said screw having a head, the friction ring being engaged axially on the said screw heads through said apertures, with the apertures defining a circumferential clearance between themselves and said screw heads.

9. A torsion damper according to claim 7, wherein said secondary rotatable part includes a radial plate and a radial ring fixed with respect to said radial plate, with said radial ring defining said shoulder.

10. A torsion damper according to claim 2, further including a thrust ring acting between said second resilient means and said friction ring, said thrust ring being mounted on said second one of said primary and secondary parts for rotation therewith.

* * * * *